(12) United States Patent
Troy et al.

(10) Patent No.: US 7,893,157 B2
(45) Date of Patent: Feb. 22, 2011

(54) POLYMERIC COMPOSITIONS HAVING LOW GLASS TRANSITION TEMPERATURES

(75) Inventors: Edward Joseph Troy, Bristol, PA (US); David John McDonald, Fairless Hlls, PA (US); Jane Elizabeth Weier, Hopewell, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 727 days.

(21) Appl. No.: 10/430,195

(22) Filed: May 5, 2003

(65) Prior Publication Data

US 2004/0039123 A1 Feb. 26, 2004

Related U.S. Application Data

(60) Provisional application No. 60/405,990, filed on Aug. 26, 2002.

(51) Int. Cl.
C08L 27/02 (2006.01)
C08L 27/06 (2006.01)
C08L 33/06 (2006.01)
C08L 9/00 (2006.01)

(52) U.S. Cl. .................. 525/85; 525/239; 525/227; 525/228

(58) Field of Classification Search .............. 525/227, 525/228, 239, 85
See application file for complete search history.

(56) References Cited

U.S. PATENT DOCUMENTS

| | | | |
|---|---|---|---|
| 3,671,607 A * | 6/1972 | Yoon Chai Lee ............. 525/84 |
| 3,859,384 A | 1/1975 | Carty et al. |
| 3,925,510 A | 12/1975 | Ide et al. |
| 4,086,296 A | 4/1978 | Carty |
| 4,520,166 A | 5/1985 | Kamada et al. |
| 4,692,295 A * | 9/1987 | Vinatier ..................... 264/291 |
| 4,699,948 A | 10/1987 | Kishida et al. |
| 4,724,158 A * | 2/1988 | Mollett et al. .............. 427/496 |
| 4,730,024 A | 3/1988 | Kishida et al. |
| 4,906,699 A | 3/1990 | Siol |
| 5,055,529 A | 10/1991 | Kishida et al. |
| 5,288,825 A | 2/1994 | Toyooka et al. |
| 5,314,965 A | 5/1994 | Kishida et al. |
| 5,352,500 A | 10/1994 | Memon |
| 5,609,817 A * | 3/1997 | Patil et al. .................... 264/564 |
| 5,942,581 A * | 8/1999 | Nakamura et al. .......... 525/309 |
| 6,550,480 B2 * | 4/2003 | Feldman et al. ............. 128/831 |
| 6,624,212 B2 | 9/2003 | Weier |
| 6,762,245 B2 * | 7/2004 | Bonnet et al. ................. 525/88 |
| 2001/0056150 A1 * | 12/2001 | Smith et al. ................. 524/458 |
| 2002/0013387 A1 * | 1/2002 | Weier et al. ................. 523/201 |
| 2004/0030046 A1 | 2/2004 | Schultes |
| 2004/0039105 A1 * | 2/2004 | Chirgott ..................... 524/523 |
| 2004/0039107 A1 * | 2/2004 | Chirgott ..................... 524/525 |
| 2004/0039118 A1 * | 2/2004 | Chirgott ..................... 525/67 |
| 2004/0039123 A1 * | 2/2004 | Troy et al. ................... 525/224 |

FOREIGN PATENT DOCUMENTS

| | | |
|---|---|---|
| EP | 0 132 317 | 1/1985 |
| EP | 0 217 397 | 4/1987 |
| EP | 1 153 936 | 11/2001 |
| JP | 04014443 | 1/1992 |
| WO | WO 02/22715 | * 3/2002 |

OTHER PUBLICATIONS

Gould, R.W. and Player, J.M., "Methyl Methacrylate Copolymers As Processing Aids For Rigid PVC" *Kunstoffe*, vol. 69, No. 7, pp. 393-396, (1979), [translation].

Lee, Yuder and Cheng, Kung-Chun, "Effects for Poly(Methyl Methacrylate-co-n-Butyl Acrylate) on the Properties and Processing Behavior of Poly(Vinyl Chloride)" *Journal of Applied Polymer Science*, vol. 30, pp. 3605-3616, (1985).

Saroop, U.K., Sharma, K.K., and Jain, K.K., "Studies on the Polyblends of Poly(vinyl Chloride) with Various Methacrylate Copolymers, Physical and Mechanical Properties. I." *Journal of Applied Polymer Science*, vol. 38, pp. 1421-1437, (1989).

D.L. Dunkelberger, "Processing Aids for Polyvinyl Chloride," Chapter 60 of Plastics Additives and Modifiers Handbook, edited by Jesse Edenbaum, Van Nostrand Reinhold, 1992.

* cited by examiner

*Primary Examiner*—Jeffrey C Mullis
(74) *Attorney, Agent, or Firm*—Carl P. Hemenway

(57) ABSTRACT

The present invention provides polymeric compositions having a high polymer size and a low Tg. These novel compositions are useful as plastic additives. Also provided is a method of improving the processing of a matrix resin by adding one or more of the novel polymeric compositions.

17 Claims, No Drawings

POLYMERIC COMPOSITIONS HAVING LOW GLASS TRANSITION TEMPERATURES

This application claims the benefit of U.S. Provisional Application No. 60/405,990, filed Aug. 26, 2002.

The present invention relates to relatively large size polymeric compositions having low glass transition temperatures. These compositions are useful as homopolymers or copolymers resins as a means of improving the properties and processability of polymeric matrix resins. The present invention also pertains to processes for preparing and using such polymeric compositions, as well as processes for preparing polymeric matrix resins containing the same.

It has been known for many decades that thermoplastic resins often do not possess the physical or processing characteristics necessary to make them commercially viable. Accordingly, compositions are often added to enhance the plastics' characteristics.

The performance and process enhancing compounds used in the plastics industry (hereinafter "plastic additives") are typically polymeric. Common examples of polymeric plastic additives include: those which are used to control the rheological characteristics of the plastic resin and, in turn, optimize the resin's processability and increase the resin's process efficiency (hereinafter "processing aids"); those which are used to improve the impact strength of the plastic resin (hereinafter "impact modifiers"); and, those which lubricate the matrix resin so that it does not stick to the walls of the processing equipment (hereinafter "lubricants").

Some matrix resins, including for example polyvinyl chloride, upon heating, do not easily make the transition (called "fusion") from solid form to smoothly-flowing melt. Processing aids can be useful in improving fusion in such resins. One way of judging the ease of fusion is to measure the time required for a solid polymer to form a homogeneous melt upon exposure to heat and mechanical work.

Many thermoplastic matrix resins contain at least some of the aforementioned additives. A brief description of each follows.

Processing aids are useful for increasing thermoplastic resin melt strength which is important for certain thermoplastic process applications, such as blow molding, injection molding, foaming and thermoforming. Most conventional processing aids for thermoplastic resins are polymers and copolymers containing units polymerized from ethylenically unsaturated monomers such as vinyl aromatic, (meth)acrylonitrile, and/or $C_1$-$C_4$ alkyl (meth)acrylate monomers. Moreover, most conventional processing aids are prepared using emulsion polymerization techniques which yield dispersions of 20-500 nm mean diameter.

Conventional processing aids are hard polymeric particles which have a glass transition temperature (Tg) of at least 30° C., typically at least 50° C., and more typically at least 70° C. Conventional processing aids have very high molecular weights—ranging from $0.1 \times 10^6$ to $12 \times 10^6$ g/mole. Generally, the molecular weight of most conventional processing aids range from $0.5 \times 10^6$ to $8 \times 10^6$ g/mole.

The amount of processing aid used in a thermoplastic resin formulation varies with the type of resin, its application and the processing conditions to which it is subjected. If used, processing aids are typically employed at a concentration ranging from 0.1 and 20 parts for every 100 parts of the matrix resin.

Impact modifiers are typically provided as multi-stage, core-shell emulsion polymers having a core or rubbery stage based on homopolymers or copolymers of butadiene and/or acrylate monomers. The core portion of most impact modifiers is generally soft—its Tg is generally less than −20° C. On the other hand, the shell portion of most impact modifiers is generally hard—its Tg is generally greater than 30° C.

Impact modifiers are often used in matrix polymers such as acrylonitrile-butadiene-styrene ("ABS"), styrene-acrylonitrile copolymers, methyl methacrylate polymers, poly(vinyl chloride) ("PVC") and other poly(vinyl halide) polymers, various engineering resins such as polycarbonate, polyesters, or polyamides, and thermosetting resins such as epoxies. Impact modifiers containing one or more rubbery copolymers of butadiene and styrene and at least one shell of poly(methyl methacrylate) are known in the art as methylmethacrylate-butadiene-styrene ("MBS") plastic additives. Similarly, impact modifiers containing one or more rubbery copolymers of alkyl acrylates and at least one shell of poly(methyl methacrylate) or copolymers thereof are known in the art as acrylic impact modifiers ("AIM") plastics additives. The amount of impact modifiers used in a thermoplastic resin formulation varies with the type of resin, its application and the processing conditions to which it is subjected. If used, impact modifiers are typically employed at a concentration ranging from 0.5 and 40 parts for every 100 parts of the matrix resin.

Lubricants are additives that perform specific functions in the plastic matrix system. A minor quantity of lubricant (e.g., typically 0.01 to 5 parts per hundred of plastic matrix resin) provides a substantial decrease in resistance to movement of polymer chains in relation to other polymer chains or to objects such as processing equipment. Typical lubricants are small molecules with softening points or melting points that are within or below the processing temperature range of the thermoplastic resin system. They need to be compatible enough with the thermoplastic resin system so as to improve the processing of the resin system, while not adversely affecting the mechanical properties of that system. They can be used in concentrations as low as 0.01 phr (parts per hundred parts of the resin) or as high as 5 phr in combinations. Examples of lubricants used in the plastics additives industry include: paraffin waxes, low molecular weight polyethylene waxes, carboxylic acids (and their esters), aliphatic alcohols, amides, esters, carboxylic acid salts, and the like.

Lubricants usually impart one or more useful properties (known herein as "lubricant properties") to the matrix resin. Lubricants often reduce the viscosity of the melted matrix resin, thus reducing the torque necessary to rotate parts of processing equipment in contact with the melted matrix resin. In some cases, this lower torque is detected as a smaller load on the motor that drives the rotating part. Independent of the viscosity reduction, lubricants often aid the melted matrix resin in releasing from metal surfaces; this effect can sometimes be observed by testing the tendency of the melted matrix resin to release from the metal surfaces of a two-roll mill.

Most commercial matrix resin systems typically include from 0.05 to 50 weight percent of plastic additives, based on the weight of the matrix resin. Notwithstanding the widespread use of additives such as processing aids, impact modifiers and lubricants, there is a constant need to reduce the cost of their implementation, while maintaining or improving the properties of the modified matrix resin systems. Accordingly, the plastic additives industry and the plastic manufacturing industry would greatly welcome processes to produce plastic additives which significantly reduce production and use costs while simultaneously improving their performance properties.

U. K. Saroop et. al. (*Journal of Applied Polymer Science*, volume 38, pages 1421-1437, 1989) disclose the addition of a variety of acrylic polymers to polyvinyl chloride. However, it is desired to provide systems (i.e., admixtures of matrix resins and plastic additives) that require fewer ingredients yet retain useful properties such as, for example, desirable fusion times, desirable degree of lubricant properties, desirable level of gloss, and desirable impact resistance.

Accordingly, one object of this invention provides novel polymeric compositions which have relatively large sizes and have low glass transition temperatures.

Another object of this invention provides novel polymeric compositions which possess processing aid properties and lubricant properties, including processes for preparing and using the same.

Yet another object of this invention provides a novel plastic additive system which comprises an impact modifier and a polymeric composition which possess processing aid properties and lubricant properties, including processes for preparing and using the same.

Still another object of this invention provides novel polymeric matrix resin systems which comprise a matrix resin and a polymeric composition which possesses processing aid properties and lubricant properties, including processes for preparing and using the same.

Still a further object of this invention provides novel polymeric matrix resin systems which comprise a matrix resin and a novel plastic additive system which comprises an impact modifier and a polymeric composition which possess processing aid properties and lubricant properties, including processes for preparing and using the same.

These and other objects will be apparent to those skilled in the art after reading the specification and appended claims.

In a first aspect of the present invention, there is provided a method for improving the processability of a matrix resin, comprising adding to said matrix resin a polymeric composition having a Polymer Size Index of 2 or higher and a glass transition temperature (Tg) of at most 20° C., wherein said polymeric composition comprises a first polymeric stage, wherein at least 50 weight percent of said first polymeric stage comprises a first polymeric component having units derived from one or more monomers selected from the group consisting of butadiene and $C_1$ to $C_{18}$ alkyl (meth)acrylates.

In a second aspect of the present invention, there is provided a multi modal polymeric composition that can be used as a plastic additive, said multi modal polymeric composition comprising:
  a) a first ingredient comprising at least one polymer with Tg of 30° C. or higher and polymeric particles of at least 30 nm, and
  b) a second ingredient comprising polymeric particles having an average particle size of at least 30 nm, a Polymer Size Index of 2 or higher and a Tg of at most 20° C., said processing aid particles comprising a first polymeric stage, wherein at least 50 weight percent of said first polymeric stage comprises a first polymeric component having units derived from at least one monomer selected from the group consisting of butadiene and $C_1$ to $C_{18}$ alkyl (meth)acrylates;

wherein the weight ratio of said first component to said processing aid particles is from about 99.5/0.5 to about 50/50.

In a third aspect of the present invention, there is provided a polymeric composition having Polymer Size Index of 2 or higher and a glass transition temperature (Tg) of at most 20° C., said composition comprises a first polymeric stage, wherein at least 50 weight percent of the first polymeric stage comprises a first polymeric component having units derived from one or more monomers selected from the group consisting of butadiene and $C_1$ to $C_{18}$ alkyl (meth)acrylates.

The term "molecular weight" used herein refers to the weight average molecular weight of polymer molecules as determined by the gel permeation chromatography (GPC) method, also known as Size Exclusion Chromatography (SEC). One useful GPC method is the following, referred to herein as the High-MW-Low-Tg, ("HMLT") method. A liquid chromatograph is made of a Waters 590 Model pump (Waters Co., Milford, Mass., USA), an Agilent HP1100 autosampler (Agilent Co., Waldbronn, Germany), a Waters CH-430 Model column oven (Waters Co., Milford, Mass., USA), and a Waters 410 Model differential refractometer (Waters Co., Milford, Mass., USA). System control, data acquisition, and data processing are performed using PL Caliber™ software (Polymer Laboratories, Church Stretton, UK). Separations are performed using a column set made of one PLgel™ 20 µm guard column (50 mm length×7.5 mm inner diameter) and two PLgel™ Mixed A analytical columns (300 mm length×7.5 mm inner diameter) connected in series. Columns are packed with polystyrene-divinyl benzene gel (pore size "Mixed A," particle size 20 µm, from Polymer Laboratories, Church Stretton, UK). Samples are prepared in HPLC grade THF at concentration of 2 mg/ml. A 100 µl sample solution is injected into the chromatographic system. Xylene is used as the internal flow marker. The reference is Paraloid™ K-120ND (Rohm and Haas Co., Philadelphia, Pa., USA), which had been calibrated by extrapolation against poly(methyl methacrylate) standards of known molecular weight obtained from Polymer Laboratories, Church Stretton, UK. Eluent is HPLC grade THF; flow rate is 1 ml/min; column temperature is 40° C.; and detection method is refractive index.

Alternatively, the size of a polymer can be judged by measuring the viscosity of a solution of that polymer. In general, for a particular composition of polymer, higher viscosity corresponds to larger size polymer. One such viscosity-measurement method is the "solution Brookfield" method, defined herein as follows: a solution of polymer in tetrahydrofuran (THF) or in a mixture of THF and water is prepared, using 2.8 g of polymer solids in 80 g of solution weight. The solution is measured with a Brookfield LVF viscometer with Number 2 spindle at 30 rpm. If the polymer exists as a solid, 2.8 g are dissolved in THF. If the polymer exists as a latex, a sufficient amount of latex is chosen to have 2.8 g of polymer solids, and that amount of latex is dissolved in a sufficient amount of THF to give a total solution weight of 80 g. The solution must be shaken until the polymer dissolves, which often requires mechanical shaking for 16 hours, and may require even longer times; one method of determining that the polymer has dissolved is to alternate viscosity tests with periods of shaking until the viscosity result stops rising. After shaking, the sample is allowed to stand until all bubbles are gone before the viscosity measurement is performed.

A useful characterization of polymer size is the "Polymer Size Index," defined herein as follows. A polymeric composition has a Polymer Size Index of 4 if it meets one or both of the following two conditions: (1) its molecular weight as measured by the HMLT method is $4 \times 10^6$ g/mole or above, and (2) it has a solution Brookfield viscosity of 0.4 Pa*s (400 cps) or higher. A polymeric composition has a Polymer Size Index of 3 if it does not have Polymer Size Index of 4 and it meets one or both of the following two conditions: (1) its molecular weight as measured by the HMLT method is $3 \times 10^6$ g/mole or above, and (2) it has a solution Brookfield viscosity of 0.3 Pa*s (300 cps) or higher. A polymeric composition has a Polymer Size Index of 2 if it does not have Polymer Size Index of 3 or 4 and it meets one or both of the following two conditions: (1) its molecular weight as measured by the HMLT method is $2\times10^6$ g/mole or above, and (2) it has a solution Brookfield viscosity of 0.2 Pa*s (200 cps) or higher.

The novel polymeric compositions of the present invention have Polymer Size Index of 2 or higher; preferably 3 or higher; and more preferably 4. The term "Tg" used herein denotes the glass transition temperature of a polymer, as measured by differential scanning calorimetry (DSC), using the midpoint method.

The novel polymeric compositions of the present invention also have a Tg of at most 20° C. These novel compositions comprise at least a first polymeric stage, wherein at least 50 weight percent of the first polymeric stage comprises a first polymeric component having units derived from one or more of the following: butadiene; and $C_1$ to $C_{18}$ alkyl (meth)acrylates.

Also encompassed by this invention is a multimodal particulate system containing a first population of polymeric particles having a core portion with a Tg less than −20° C. and a shell portion with a Tg greater than 30° C.; and a second population of polymeric particles having a Polymer Size Index of 2 or higher, and a Tg of at most 20° C.

The term "rubbery" used herein denotes the thermodynamic state of a polymer above its glass transition temperature.

The term "units derived from" used herein refers to polymer molecules that are synthesized according to known polymerization techniques wherein a polymer contains "units derived from" its constituent monomers.

The term "stage" used herein is intended to encompass its broadest possible meaning, including the meaning conveyed in prior art such as in U.S. Pat. No. 3,793,402; U.S. Pat. No. 3,971,835; U.S. Pat. No. 5,534,594; and U.S. Pat. No. 5,599,854; which offer various means for achieving "staged" polymers.

The term "parts" used herein is intended to mean "parts by weight". Unless otherwise stated, "total parts by weight" do not necessarily add to 100.

The term "weight percent" used herein is intended to mean "parts per hundred by weight" wherein the total parts add to 100.

The term "particle size" used herein refers to the mean particle diameter of a population of particles.

The term "high solids" used herein refers to an emulsion having a solids concentration of at least 30 weight percent of the total emulsion.

The novel polymeric compositions of the present invention are unique in that they have a Polymer Size Index of 2 or higher, and a low Tg. The specific Polymer Size Index and Tg of the compositions encompassed by this invention depends, in part, on the desired end use. Those skilled in the art will be able to use the compositions of this invention for many end uses. However, as illustrative purposes, the polymeric compositions of the present invention will be described as a plastic additive which has processing aid and lubricant properties.

The polymeric compositions encompassed by the present invention have many advantageous properties. For example, if the polymeric compositions encompassed by the present invention are used as plastic additives, the resulting systems often have desirable fusion characteristics and lubricant properties, even when the amount of conventional processing aid is reduced partially or completely, or when the amount of lubricant is reduced partially or completely. In some cases, the resulting systems have desirable fusion characteristics and lubricant properties, even when the amounts of both lubricant and conventional processing aid, independently of each other, are reduced partially or completely. Accordingly, where a plastic compounder would formerly have needed one or more lubricants plus one or more conventional processing aids, that compounder, by using the polymeric compositions of the present invention, can make desirable systems while using smaller amounts of lubricants or of traditional processing aids or of both, and the compounder may be able to completely eliminate one or more of the lubricants, one or more of the traditional processing aids, or one or more of both. In some cases, by using the polymeric compositions of the present invention, the compounder will be able to eliminate all lubricants and traditional processing aids. This has a number of obvious cost, processing and handling advantages for the compounder, as well as the plastic additive manufacturer.

As stated above, the polymeric compositions of the present invention have a Polymer Size Index of 2 or higher. If used as a plastic additive, their Polymer Size Indices are preferably 3 or higher; more preferably 4 or higher. Independently, if used as a plastic additive, their molecular weights are preferably at least $4\times10^6$ g/mole or at least $5\times10^6$ g/mole. The upper limit of their molecular weights is determined, in part, by the processing conditions to which they are exposed, as well as their desired end use. Typically, the molecular weight of the polymeric compositions of the present invention are less than $12\times10^6$ g/mole or less than $10\times10^6$ g/mole or less than $8\times10^6$ g/mole.

The polymeric compositions of the present invention have a low Tg. Specifically, their Tg's are less than 20° C. If used as a plastic additive, in one preferred embodiment their Tg's are less than 10° C., or less than 0° C., or less than −10° C., or less than −20° C., or less than −40° C., or less than −60° C. The lower limit of their Tg's depends, in part, on the processing conditions to which the polymeric compositions of the present invention are exposed, as well as their desired end use.

These novel compositions comprise at least a first polymeric stage, wherein at least 50 weight percent of the first polymeric stage comprises a first polymeric component having units derived from one or more of the following: butadiene and $C_1$ to $C_{18}$ alkyl (meth)acrylates. The first polymeric component may or may not contain, in addition to units derived from butadiene and/or $C_1$ to $C_{18}$ alkyl (meth)acrylates, units derived from one or more of the following monomers: dienes other than butadiene; isoprene; (meth)acrylic acid; substituted $C_1$ to $C_{18}$ alkyl (meth)acrylates such as, for example hydroxyethyl (meth)acrylate; styrene; substituted styrenes such as, for example, alpha methyl styrene; vinyl alcohols; vinyl ethers; vinyl esters such as vinyl acetate; vinyl halides such as vinyl chloride; and vinyl nitriles such as acrylonitrile. Thus, this invention encompasses polymeric compositions which have a first polymeric stage comprising a first polymeric component comprising copolymers having units derived from one or more of butadiene and $C_1$-$C_{18}$ alkyl (meth)acrylate(s); optionally, these copolymers may additionally have units derived from other monomers; the units derived from butadiene and/or $C_1$-$C_{18}$ alkyl (meth)acrylate(s) and/or optional other monomers may be included in any ratio that provides a Tg of less than 20° C.

The preferred first polymeric stage depends, in part, on the processing conditions to which the polymeric compositions of the present invention are exposed, as well as their desired end use. If used as a plastic additive, in one preferred embodiment, at least 50 weight percent of the first polymeric stage comprises a first polymeric component having units derived from one or more $C_1$ to $C_{18}$ alkyl (meth)acrylate, or at least 60 weight percent of the first polymeric stage comprises a first polymeric component having units derived from one or more $C_1$ to $C_{18}$ alkyl (meth)acrylate, or at least 70 weight percent of the first polymeric stage comprises a first polymeric component having units derived from one or more $C_1$ to $C_{18}$ alkyl (meth)acrylate, or at least 80 weight percent of the first polymeric stage comprises a first polymeric component having units derived from one or more $C_1$ to $C_{18}$ alkyl (meth)acrylate.

The upper weight percent limit of the first polymeric component also depends, in part, on the processing conditions to which the polymeric compositions of the present invention are exposed, as well as their desired end use. If used as a plastic additive, in one preferred embodiment, 100 weight percent of the first polymeric stage comprises a first polymeric component having units derived from one or more $C_1$ to $C_{18}$ alkyl (meth)acrylate, or at most 95 weight percent of the first polymeric stage comprises a first polymeric component having units derived from one or more $C_1$ to $C_{18}$ alkyl (meth)acrylate, or at most 90 weight percent of the first polymeric stage comprises a first polymeric component having units derived from one or more $C_1$ to $C_{18}$ alkyl (meth)acrylate, or at most 85 weight percent of the first polymeric stage comprises a first polymeric component having units derived from one or more $C_1$ to $C_{18}$ alkyl (meth)acrylate.

In the above illustrative examples wherein the first polymeric stage comprises a first polymeric component having units derived from one or more $C_1$ to $C_{18}$ alkyl (meth)acrylate, if the polymeric composition is used as a plastic additive, in one preferred embodiment, the first polymeric component has units derived from at least one of the following: methyl acrylate, ethyl acrylate, butyl acrylate, hexyl acrylate, octyl acrylate, 2-ethylhexyl acrylate, dodecyl acrylate. In another preferred embodiment, the first polymeric component has units derived from at least one of the following: methyl acrylate, ethyl acrylate, butyl acrylate, or 2-ethylhexyl acrylate. In still another preferred embodiment, the first polymeric component has units derived from ethyl acrylate.

In some embodiments, the first polymeric component has units derived from one or more $C_1$ to $C_{18}$ alkyl (meth)acrylates that has Tg of $-10°$ C. or lower. As used herein, the "Tg" of a monomer is the Tg of a homopolymer of that monomer. In some of such embodiments, the first polymeric component has 50% or more by weight of units derived from $C_1$ to $C_{18}$ alkyl (meth)acrylates that have Tg of $-10°$ C. or lower.

In some embodiments, the first polymeric component has units derived from one or more monomers other than $C_1$ to $C_{18}$ alkyl (meth)acrylates, either instead of or in addition to units derived from $C_1$ to $C_{18}$ alkyl (meth)acrylates. Some examples of monomers other than $C_1$ to $C_{18}$ alkyl (meth) acrylates known to be useful in the present invention are vinyl aromatics and aromatic (meth)acrylates. Useful vinyl aromatics include, for example, styrene and substituted styrenes such as, for example, alpha-methyl styrene. Useful aromatic (meth)acrylates include, for example, benzyl acrylate and benzyl methacrylate.

In some embodiments, the first polymeric component contains units derived from ethyl acrylate and, optionally, one or more co-monomers. Monomers useful as co-monomers include, for example, styrene, methyl methacrylate, 2-ethylhexyl acrylate, lauryl methacrylate, glycidyl methacrylate, butyl methacrylate, and benzyl methacrylate.

In instances where the first polymeric component is less than 100 weight percent of the first polymeric stage, the remaining weight percentage can be made up of at least a second polymeric component. It is within the scope of this invention for there to be a plurality of subsequent polymeric components. A limitation on these subsequent polymeric components is that their total weight percentage cannot exceed 50 weight percent of the first polymeric stage.

The preferred amount of the second polymeric component present depends, in part, on the processing conditions to which the polymeric compositions of the present invention are exposed, as well as their desired end use. If used as a plastic additive, in one preferred embodiment, at least 5 weight percent of the first polymeric stage comprises a second polymeric component, or at least 10 weight percent of the first polymeric stage comprises a second polymeric component, or at least 15 weight percent of the first polymeric stage comprises a second polymeric component.

The upper weight percent limit of the second polymeric component present also depends, in part, on the processing conditions to which the polymeric compositions of the present invention are exposed, as well as their desired end use. If used as a plastic additive, in one preferred embodiment, at most 50 weight percent of the first polymeric stage comprises a second polymeric component, or at most 40 weight percent of the first polymeric stage comprises a second polymeric component, or at most 30 weight percent of the first polymeric stage comprises a second polymeric component.

If present, the second polymeric component can be any suitable polymeric compound that yields a Tg of $20°$ C. or less for the final polymeric composition. Examples of such suitable polymeric compounds include: other $C_1$ to $C_{18}$ alkyl (meth)acrylates, isoprene, vinyl acetate, styrene, alpha methyl styrene, acidic monomers such as (meth)acrylic acid, isobutylene, (meth)acrylonitrile, etc.

The preferred second polymeric component depends, in part, on the processing conditions to which the polymeric compositions of the present invention are exposed, as well as their desired end use. If used as a plastic additive, in one preferred embodiment, the second polymeric component comprises at least one of the following: $C_1$ to $C_{18}$ alkyl (meth) acrylates, alpha methyl styrene, styrene, acidic monomers such as (meth)acrylic acid. In another preferred embodiment, the second polymeric component comprises at least one of the following: $C_1$ to $C_{18}$ alkyl (meth)acrylates.

In some embodiments, the first polymeric stage can also contain units derived from at least one multi-unsaturated monomer. If present, the concentration of such units ranges from 0.001 weight percent to 5 weight percent of the total weight of the core portion. The multi-unsaturated monomer may be one in which the unsaturated groups are similar and of equal reactivity, such as in divinyl benzene, divinyl adipate, ethylene glycol dimethacrylate, butylene glycol diacrylate, trimethylolpropane trimethacrylate, and the like. On the other hand, the multi-unsaturated monomer may be one in which the unsaturated groups are dissimilar and of unequal reactivity, such as in diallyl maleate, allyl methacrylate, allyl acrylate, and the like.

In some embodiments, the polymeric compositions of the present invention exist in a mixture with water or other fluid. In some such embodiments, the polymeric composition is dissolved or dispersed in the water or other fluid. It is often desirable to separate the polymeric composition from the water or other fluid. This process of separation is referred to herein as "isolation." In some cases, the polymeric composition, after isolation, exists in the form of a powder.

Prior to being formed into a desired shape (for matrix resins), or being blended with a matrix resin so as to improve its properties or processability (for plastic additives), such polymeric compositions are typically in the form of a powder. However, polymeric compositions having the Polymer Size Index and Tg properties of those encompassed by the present invention can be difficult to isolate as a stable powder. That is, it is sometimes difficult to find a method of isolation that results in a polymeric composition in the form of a stable powder. The term "stable" as it pertains to polymeric powders means the ability of the individual powder particles to remain in a flowable form during normal storage, handling and processing procedures. One reason for this difficulty is that the polymeric compositions encompassed by the present invention are soft. Thus, they have the tendency to stick together during isolation and handling which reduces the powder's stability.

One way of isolating the polymeric compositions of the present invention in the form of a stable powder is by applying a second polymeric stage over the first polymeric stage. If used in aiding isolation, the second polymeric stage is a relatively high Tg when compared to that of the first polymeric stage. It is, however, within the scope of this invention for the second polymeric stage to have a Tg which is within the same range, or lower than that of the first polymeric stage. For illustrative purposes, an embodiment of this invention will be described wherein the second polymeric stage is used to facilitate the formation of a stable powder.

In this specific embodiment, the second polymeric stage is typically at least 1 weight percent, or at least 2 weight percent, or at least 3 weight percent of the particle's total weight. On the other hand, when practicing this embodiment, the polymeric composition's second polymeric stage portion is typically at most 35 weight percent, or at most 30 weight percent, or at most 25 weight percent of the particle's total weight.

The second polymeric stage that can be present when practicing this embodiment of the invention is typically comprised of a hard polymer or co-polymer having a glass transition temperature of at least 20° C. It is within the scope of this invention for the second polymeric stage to have a Tg of at least 30° C., or at least 40° C., or at least 50° C.

In these instances, the second polymeric stage is typically formed from at least 50 weight percent of units derived from methyl methacrylate or styrene. For example, the second polymeric stage may be a homopolymer of methyl methacrylate or styrene, a copolymer of methyl methacrylate or styrene with a small amount of an alkyl acrylate or an alkyl methacrylate, such as ethyl methacrylate or butyl acrylate, a copolymer of methyl methacrylate or styrene with methacrylic acid, and the like. The second polymeric stage may be partially or totally attached to or grafted to the first polymeric stage.

In this specific embodiment, the molecular weight of the second polymeric stage is typically greater than $1 \times 10^5$ g/mole However, molecular weights of the second polymeric stage can be greater than $1 \times 10^6$ g/mole and greater than $5 \times 10^6$ g/mole and even greater than $10 \times 10^6$ g/mole In some instances, the polymeric compositions of the present invention also have an intermediate layer interposed between the first polymeric stage and the second polymeric stage (hereinafter referred to as the "third polymeric stage"). If present in such a polymeric composition, the third polymeric stage typically comprises units derived from $C_1$ to $C_{18}$ alkyl (meth)acrylates. Generally, at least 50 weight percent of the third polymeric stage is comprised of $C_1$ to $C_{18}$ alkyl (meth)acrylates. It is within the scope of this embodiment of the invention for the third polymeric stage to be comprised essentially of $C_1$ to $C_{18}$ alkyl (meth)acrylates. Thus, the third polymeric stage may be a homopolymer of a $C_1$ to $C_{18}$ alkyl (meth) acrylate, a copolymer of $C_1$ to $C_{18}$ alkyl (meth)acrylates with a small amount, such as from about 1 to about 20 parts of another $C_1$ to $C_{18}$ alkyl (meth)acrylate, a copolymer of $C_1$ to $C_{18}$ alkyl (meth)acrylates with styrene, a copolymer of $C_1$ to $C_{18}$ alkyl (meth)acrylates with methacrylic acid, and the like.

When present, the third polymeric stage is typically at least 2 weight percent of the polymeric composition. It is within the scope of this embodiment of the invention for the third polymeric stage to be at least 5 weight percent of the polymeric composition, or at least 7 weight percent of the polymeric composition. On the other hand, when present, the third polymeric stage is typically at most 25 weight percent of the polymeric composition. It is within the scope of this embodiment of the invention for the third polymeric stage to be at most 20 weight percent of the polymeric composition, or at most 15 weight percent of the polymeric composition. The preferred weight percentage depends upon the desired end use.

The third polymeric stage may be partially or totally attached to or grafted to the first polymeric stage. It may further contain from about 0.05 weight percent to about 5 weight percent of one or more multi-unsaturated monomers, as defined above.

The polymeric compositions encompassed by the present invention can be made by a number of different ways. For illustrative purposes, one process for making the novel polymeric compositions will be disclosed. However, after reading this description, those skilled in the art will know other methods which can be used, and which of those methods best suits their needs and resources. All such methods for making the polymeric compositions are intended to be encompassed by the present invention.

In this illustrative process, an aqueous dispersion of the polymeric compositions is prepared by emulsion polymerization. The reaction conditions by which the polymerization process is run to form the latex emulsions used when practicing this invention include those which are known in the art. The initiators employed are those common to emulsion polymerization, such as persulfates, peresters, hydroperoxides, peracids, azo compounds, and the like. Some or all of the initiators may be combined with activators to form "redox" pairs. Such activators include sodium formaldehyde sulfoxylate, sodium metabisulfite, sodium hydrosulfite, and the like.

In one specific emulsion process, the polymerization step is carried out in a suitable reactor wherein the reactants are suitably combined, mixed, and reacted in an aqueous medium, and wherein heat is transferred in to and away from the reaction zone. The monomer(s) can be added slowly (i.e., gradually, as in a semi-batch process) over time or quickly as a "shot" (i.e., batch) into the reactor wherein a fast rate of initiation and propagation is indicated by a fast rise in reactor temperature. In certain embodiments, it is preferred that the monomer(s) be added as a shot. Continuous feeding of the monomer(s) into the reactor over time is useful where it is important to control the reaction temperature.

The monomer(s) may be polymerized in the presence of a pre-formed polymer dispersion (a "seed" polymer), for control of desired particle size or for structural modification of the resulting polymer. If used, the "seed" polymer often has a relatively small particle size, such as below 100 nm.

Seed polymers may be separately made and added to control particle size, or may be generated in situ. The monomers may be added "neat", as pre-formed emulsions, or by use of an in-line emulsifier while being added to the reactor.

The seed polymer can be compositionally similar to that of the first polymeric stage. For example, the seed may be a polymer of a rubbery material, and may be similar or different in composition to the first polymeric stage. Alternatively, the seed may be a hard non-rubbery polymer (e.g., polystyrene or poly(methyl methacrylate)). Seed polymers can be used as a means of adjusting the refractive index of the resulting polymeric compositions. A method of doing this is disclosed in U.S. Pat. No. 3,971,835, which is incorporated herein by reference.

Continuing with this illustrative embodiment, an emulsion is formed having a solids portion which comprises the polymeric compositions encompassed by the present invention. It is within the scope of this embodiment of the invention for there to be: (a) only one population of polymeric compositions having an average particle size (hereinafter referred to as a "unimodal system"), or (b) two or more populations of polymeric compositions, each having its own distinct average particle size, its own distinct particle composition, or its own distinct particle size and polymer composition (hereinafter singly and collectively referred to as a "multimodal system").

When practicing this specific embodiment of the invention, if the solids component of the formed latex emulsion is a unimodal system, the average particle size are typically at least 30 nm. Similarly, if the solids component of the formed latex emulsion is a multimodal system wherein the differences of the populations is only their composition (i.e., the average particle size of both populations is essentially the same), the average particle size of both populations are typically at least 30 nm. Finally, if the solids component of the formed latex emulsion is a multimodal system wherein the differences of the populations is at least their average particle size (i.e., they may be compositionally the same or different), the average particle size of the smaller population is typically at least 30 nm, and the average particle size of the larger population is typically at least 70 nm. In instances where the solids component of the latex emulsion is a multimodal system wherein the differences of the populations is at least their average particle size, the total average particle size of the sum of the populations is typically at least 50 nm.

Accordingly, regardless of whether the solids component of the formed emulsion is a unimodal or a multimodal system, the total average particle size of the sum of the populations is typically at least 30 nm. It is within the scope of this embodiment of the invention for the total average particle size of the sum of the populations to be less than 30 nm. In many instances, however, the total average particle size of the sum of the populations is at least 30 nm. In these embodiments, the total average particle size of the sum of the populations can be at least 50 nm, or at least 70 nm.

When practicing certain specific embodiments of the invention, the emulsion has a solids component concentration of at least 15 weight percent. It is within the scope of this embodiment for the solids component concentration of the latex emulsion to be less than 15 weight percent. In many instances, however, the emulsion has a solids component concentration of at least 15 weight percent. In these embodiments, the emulsion can have a solids component concentration of at least 25 weight percent; or at least 35 weight percent.

The polymeric compositions of the present invention can be used in several forms containing various amounts of water, including emulsions, aqueous dispersions, coagulated slurries, wetcakes, crumb, granular or powders. Due to the soft, rubbery nature of the polymeric composition's first polymeric stage, if there is no subsequent polymeric stage present, it is preferred to use the polymeric composition in the form of an emulsion, aqueous dispersion, coagulated slurry, wetcake, or crumb or granular form.

However, if desired to be used in the form of a powder, it is preferred that the polymeric composition further comprise a second polymeric component which has a Tg of at least 30° C., preferably a Tg of at least 50° C. Powder forms of the polymeric compositions encompassed by the present invention can be isolated from an aqueous dispersion or emulsion by a number of different ways.

The polymeric compositions of the present invention can be used in any form known to those skilled in the art. The preferred form depends, in part, on the needs and resources of the user. Examples of forms in which the compositions of the present invention can be used include: as an emulsion, as powders, as crumbs, as a wetcake or as pellets.

Also, when in these forms, the compositions of the present invention can be used by themselves, or in combination with other materials. For example, the compositions of the present invention can be blended as emulsions with other emulsion products such as impact modifiers, hard processing aids or with other hard substances such as fillers, clays, solid polymer particles, etc. These blends can be then used in any of the aforementioned forms (i.e., as an emulsion, as powders, as crumbs, as a wetcake or as pellets).

If it is desired to isolate the compositions of the present invention as a powder, following are two examples of ways in which this can be achieved. One approach is to coagulate the polymeric particles out of the emulsion and dry the coagulated polymeric particles (hereinafter a "coagulation process"). A typical example of such a process is one where an emulsion containing the polymeric composition is coagulated by adding a coagulating agent, such as calcium chloride, to the emulsion. The coagulated emulsion is then isolated. Thereafter, the coagulated emulsion is washed and dried. Specific examples of coagulation processes that can be employed when practicing this invention include: freeze-coagulation, salt-coagulation, methanol-coagulation, acid coagulation, and the like.

Another common approach of isolating powdery particles from an emulsion is to spray dry the dispersion or emulsion containing the polymeric composition (hereinafter a "spray-drying process").

Another way in which polymeric composition of the present invention containing only a first polymeric stage can be used is by coagulating the polymeric composition out of a latex emulsion by a coagulating agent which is formed in situ. This can be used to form a powder, or to coagulate the polymeric composition particles while adding the emulsions to a form of an extruder.

In one embodiment where the compositions of the present invention are isolated from an emulsion, the isolation process includes the steps of forming at least one emulsion that contains the novel compositions. It is, however, within the scope of this invention for two or more emulsions to be used. Regardless of the number of emulsions used when practicing this embodiment of the invention, there must be at least one that contains the novel polymeric particles and an ionic forming compound which (a) does not result in the coagulation of the population(s) of particles contained within the emulsion, but (b) does react with a second ionic forming compound to form a coagulating agent which results in the coagulation of the population(s) of particles.

Accordingly, in one embodiment, a first and a second emulsion are formed, each having a solid component comprising at least one population of particles wherein at least one of the populations is the novel polymeric composition, a liquid component comprising water, and an ionic forming compound that may be present in the emulsion's solid component, liquid component, or both. The composition and strength of the ionic forming compounds present in the individual emulsions are such that they: (a) do not result in the coagulation of the population(s) of particles contained within any given emulsion, but (b) do react with each other to form a coagulating agent which results in the coagulation of the population(s) of the particles contained within the first and second emulsions when the two emulsions are blended together.

In this embodiment, the first and second ionic forming compounds must be different. The term "different" as it refers to first and second ionic forming compounds encompasses differences in compositions, concentrations, or strengths.

The populations of particles contained within the given emulsions may also be the same or different. The term "different" as it refers to the populations of particles encompasses differences in particle size distributions, compositions, concentrations, or any combination thereof.

In another embodiment of isolating the novel particles from an emulsion, a single emulsion is formed. This emulsion has a solid component comprising at least one population of particles wherein at least one of the populations is the novel polymeric composition, a liquid component comprising water, and an ionic forming compound that may be present in the emulsion's solid component, liquid component, or both. Again, the composition and strength of the ionic forming compounds present in the emulsion are such that they: (a) do not result in the coagulation of the population(s) of particles contained within the emulsion, but (b) do react with a second ionic forming compound to form a coagulating agent which results in the coagulation of the population(s) of the particles contained within the emulsion.

In this embodiment, the first and second ionic forming compounds can be the same or different. The term "different" as it refers to first and second ionic forming compounds encompasses differences in compositions, concentrations, or strengths.

After reading this specification, those skilled in the art will be able to select the appropriate composition, concentration and strength of the first and second ionic forming compounds which best suits their specific needs. In many instances, the composition of ionic forming compounds which can be used when practicing this invention include: acids, bases, water miscible solvents, and salt solutions.

The coagulation of the particles in accordance with this embodiment results from the in situ formation of a coagulating agent. For example, where the emulsifier is a sulfate and sulfonate, this can be accomplished by the coagulating agent being a salt, such as sodium chloride, and calcium chloride. However, if the emulsion is stabilized with a soap having carboxylic acid groups, this can be accomplished by the coagulating agent being an appropriate acid.

In one specific embodiment, the first emulsion contains an acid (i.e., the first ionic forming composition) and the second emulsion contains a base (i.e., the second ionic forming composition). Then, when the emulsions are blended together, a salt (i.e., the coagulating agent) is formed in situ. The acid and base may be present in their respective emulsions as concentrated solutions of the same. If an acid and base are used as the first and second ionic forming composition, it is typically preferred that they be water soluble. It is also typically preferred that resulting salt be water soluble.

In another specific embodiment, an emulsion contains an acid (i.e., the first ionic forming composition) and the composition comprising the second ionic forming compound contains a base. Then, when the emulsion is blended with the composition comprising the second ionic forming compound, a salt (i.e., the coagulating agent) is formed in situ. The acid and base may be present in as concentrated solutions of the same. If an acid and base are used as the first and second ionic forming composition, it is typically preferred that they be water soluble. It is also typically preferred that resulting salt be water soluble.

Suitable bases that can be used when practicing these embodiments of the invention include: ammonia, low molecular weight amines such as monomethyl amine. The preferred base depends upon the specific composition of the emulsions, and the process, handling and storage conditions to which they are subjected. In instances where the emulsion comprises a high solids impact modifier, ammonia is one example of a preferred base.

A combination coagulant system comprised of ammonia and acetic acid is particularly desirable in some cases, because the resulting ammonium acetate salt will decompose and become volatile at elevated temperatures. It is possible to conceive of a number of ways in which this phenomenon can be exploited to cause evaporation of the components of the combined coagulant salt. One possible approach would be to provide an extruder with a devolatilization zone in which heat is applied to evaporate residual water, ammonia and acetic acid, thus leaving a final solid polymer which is effectively salt-free.

Suitable acids that can be used when practicing these embodiments of the invention include: carbon dioxide, sulfur dioxide, acetic acid, formic acid, and propionic acid. The preferred acid depends upon the specific composition of the emulsions, and the process, handling and storage conditions to which they are subjected. In instances where the emulsion comprises a high solids impact modifier, acetic acid is one example of a preferred acid.

The proper selection of the individual ionic forming compounds depends, in part, upon the method of coagulation. Often times, the method of coagulation will depend upon the type of surfactant present in the separate emulsions. Surfactants may be chosen from a variety known to the emulsion art, such as alkali metal or ammonium salts of long-chain alkylsulfonic acids, long-chain alkylsulfates, derivatives of aromatic sulfonates, and ethoxylated alkaryl phosphates.

Anionic surfactants are often preferred. In those instances, the adsorbed anion produces a negatively charged surface surrounded by an electrical double layer. The mechanism of salt coagulation is compression of the electrical double layer on the particle surface by the coagulant's ions. The effectiveness of the salt is especially determined by the type and charge of the cation. Cation efficiencies for compressing double layers, and their respective threshold salt concentrations, are as follows:

$$Al^{3+} \gg Ca^{2+} \sim Mg^{2+} \gg Na^{1+} \sim K^{1+} \sim NH_4^+$$

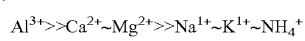

Preferred examples of coagulating agents that are formed in situ when practicing this invention include: NaCl, ammonium salts, $MgSO_4$, and $CaCl_2$.

Depending upon the solids concentrations of the individual emulsions, the liquid content of the coagulated mass will vary. Since drying processes are costly, it is often preferred for the liquid content of the coagulated mass to be minimized. When cost reduction is preferred, the concentration of liquid in the coagulated mass typically less than 70 weight percent, or less than 50 weight percent, or less than 30 weight percent.

One way of achieving low liquid content in the coagulated mass is for the first and second emulsions to have high solids concentrations of the polymeric particles contained therein. Typically, the solids concentration of the first and second emulsions is at least 15 weight percent. However, in one preferred embodiment, the solids concentration of the first and second emulsions is at least 30 weight percent, or at least 45 percent, or at least 60 percent.

After the coagulated mass is formed, it can be dried. Any conventional method can be used for drying.

When high solids emulsions as indicated above are isolated, additional cost savings can be achieved by using an extruder or a heated multi-roll mill (hereinafter individually and collectively referred to as an "extruder") as the drying mechanism. For example, most extruders can be set up to handle liquid feed streams. Thus, the first and second emulsions can easily be fed into the extruder. Once in the body of the extruder, the coagulating agent is formed which results in the formation of a coagulated mass. While the mass is mixed in the extruder, heat is applied. This heat drives off most liquids. The mass is then extruded through a die. The extruded product can then be cut into pellets or crushed into a powder.

Emulsions that can be used when practicing any embodiment of this invention can be made by a number of different ways known to those skilled in the art. Those skilled in the art will know the preferred method of forming the emulsion after reading the specification.

The polymeric compositions of the present invention may be isolated as powders. One way of isolating the polymeric composition of the present invention in the form of a powder is by co-isolating (for example, by co-coagulating or co-spray drying) the composition of the present invention with other polymeric particles. In this embodiment, if the other polymeric particles can easily form a stable powder, by selecting the proper ratio of the polymeric composition particles to the other polymeric particles, the polymeric composition particles can easily be co-coagulated or co-spray dried without destroying the stability of the resulting powder.

If the polymeric composition of the present invention is being employed as a plastic additive, this co-isolation process can be used to form a novel plastic additive system. For example, many plastic additives are sold and used while in the form of a powder. Common examples are impact modifiers and methylmethacrylate (or other high Tg polymer)-based processing aids. Blends may be made in accordance with the present invention that include a first ingredient that includes at least one hard polymer, a second ingredient that includes at least one polymeric composition of the present invention, and optionally one or more further ingredients. By "hard" is meant herein a polymer material with Tg of 30° C. or higher; preferably 50° C. or higher; and more preferably 80° C. or higher. One suitable first ingredient includes one or more impact modifiers that contain a hard polymeric phase; in some cases the hard polymeric phase is a shell. Another suitable first ingredient includes one or more conventional processing aids. Further suitable first ingredients include other hard polymers or any combination of impact modifiers with a hard polymeric phase, conventional processing aids, and other hard polymers. Suitable conventional processing aids include, for example, methylmethacrylate processing aids, such as PARALOID™ K-400 (manufactured and sold by Rohm and Haas Company).

In some co-isolation embodiments, the first ingredient comprises polymeric particles. Preferred are polymeric particles with particle size of 30 nm or larger. Suitable polymeric particles may be made by emulsion polymerization or by other methods.

In the practice of these co-isolation embodiments, a solution, dispersion, suspension, emulsion, or latex containing the first ingredient is mixed with a solution, dispersion, suspension, emulsion, or latex containing the second ingredient and with any solutions, dispersions, suspension, emulsions, or latices containing any optional further ingredients. The resulting mixture is then co-isolated to form a powder.

In some co-isolation embodiments, each ingredient contains at least one latex polymer. In some embodiments that contain latex polymers, the latex polymer has particle size of at least 30 nm. The particle sizes of the contents of each ingredient may be chosen independently. For example, the first ingredient sometimes contains at least one latex polymer with particle size of 30 nm or larger, where some or all of the latex polymer particles contain at least one polymer phase that has Tg of 30° C. or higher.

Most conventional impact modifiers are multistage polymers having a rubbery core and a hard shell. This makes them relatively easy to isolate into a stable powder. The co-coagulation of the polymeric compositions with one or more core/shell polymers to form a stable powder depends, in part, on the ratio of the single stage polymeric composition to the core/shell polymer(s). This ratio, in turn, depends, in part, on the particle size(s) of the polymeric composition particles, the particle size(s) of the core/shell polymer(s), and the composition and concentration of the shell stage of the core/shell polymer(s). The preferred ratios can easily be determined by those skilled in the art after reading this specification.

"Core/shell" refers herein to a wide variety of polymer morphologies. In some embodiments, a core polymer exists as particles that are spherical or nearly spherical. In some embodiments, a second polymer, referred to as a "shell" polymer, surrounds most or all of the core-polymer particles; the surrounding may be complete or partial. One known method of forming core/shell polymers is to make a core polymer by emulsion polymerization and then make the shell polymer by emulsion polymerization in the presence of the core polymer.

In co-isolation embodiments, the first ingredient is typically present in a concentration ranging from about 99.5 to about 50 solids weight percent of the plastic additive system, based on the solids weight of the plastic additive system. It is within the scope of this embodiment of the invention for the first ingredient to be present in a concentration ranging from about 99.5 to about 65 solids weight percent, or from about 99.5 to about 80 solids weight percent, or from about 99.5 to about 90 solids weight percent of the plastic additive system, based on the solids weight of the plastic additive system.

In co-isolation embodiments, the second ingredient is present in a concentration ranging from about 50 to about 0.5 solids weight percent of the plastic additive system, based on the solids weight of the plastic additive system. It is within the scope of this embodiment of the invention for the processing aid component to be present in a concentration ranging from about 35 to about 0.5 solids weight percent, or from about 20 to about 0.5 solids weight percent, or from about 10 to about 0.5 solids weight percent of the plastic additive system, based on the solids weight of the plastic additive system.

If this embodiment is practiced, the solids weight ratio of the second ingredient to the first ingredient is typically from about 0.5/99.5 to about 50/50. It is within the scope of this embodiment of the invention for the solids weight ratio of the second ingredient to the first ingredient to be from about 0.5/99.5 to about 35/65, or from about 0.5/99.5 to about 20/80, or from about 0.5/99.5 to about 10/90.

The above novel plastic additive system can be isolated into a stable powder, which can, thereafter, be applied to a plastic matrix system. However, it is also within the scope of the present invention for the novel plastic additive system to be co-coagulated as described above and added directly to an extruder to form plastic additive pellets, or to an extruder along with a plastic resin to form a polymeric matrix.

Embodiments in which the polymeric compositions of the present invention are isolated as powders, including powders made by co-isolation and/or powders made by other methods, and including powders made by spray drying, coagulation, other means, and combinations thereof, are known herein as "powder embodiments." In some powder embodiments, inorganic particles are also included in the powder, while in other powder embodiments, inorganic particles are not included. In powder embodiments where inorganic particles are included, the composition of the inorganic particles may be, for example, clay or other minerals; other minerals may be, for example, titanium dioxide, one or more silicon oxides, other inorganic oxides, calcium carbonate, or other inorganic carbonates. Mixtures or blends of different mineral compositions may be used. Mineral particles may be called fillers, pigments, flow aids, and/or other labels. Mineral particles may be any shape, including platelets, spheres, irregular shapes, other shapes, and combinations thereof. Mineral particles may be any particle size; in many cases, mineral particles have particle size of from 0.1 nm to 100 μm.

In powder embodiments that include mineral particles, the mineral particles may be mixed with the polymeric composition of the present invention before, during, or after the formation of the powder particles, or in any combination thereof. In some embodiments, particles of the polymeric composition of the present invention are formed, and the particles of the polymeric composition of the present invention are then coated with inorganic particles; in these embodiments, the mineral particles are smaller than the particles of the polymeric composition of the present invention. It is believed that in some cases of these embodiments, the mineral particles cover enough of the surface area of the particles of the polymeric composition of the present invention so that the ability of the resulting dry powder to flow is enhanced.

If used as a plastic additive, the polymeric composition or plastic additive system of the present invention can be blended with any plastic resin whose properties need to be enhanced. Examples of families of plastic resins which need performance and/or process enhancing compounds added thereto include: homopolymers or copolymers of polyolefins, engineering resins, and poly(vinyl halide) resins. Common examples of polyolefins include: polypropylene, and polyethylene. Common examples of engineering resins include polyesters of terephthalic acid and an aliphatic glycol, polyamides, polycarbonates, polyglutarimides, and acrylonitrile-butadiene-styrene resins. Common examples of poly(vinyl halide) resins include: poly(vinyl chloride) ("PVC"), chlorinated poly(vinyl chloride) ("CPVC"), poly(vinyl fluoride) ("PVF"), poly(vinylidene fluoride) ("PVDF"), and blends thereof. Many blends of the above-mentioned resins also form matrix resins whose performance and/or process may be desirably enhanced by the addition of polymer compositions of the present invention.

One class of resins known to be useful as matrix resins in the practice of the present invention is the class known herein as "predominantly poly(vinyl halide)" resins, defined herein as matrix resins that include at least one poly(vinyl halide) resin in amounts such that the sum of all poly(vinyl halide) resins constitutes 50% to 99.9% by weight of the matrix resin, based on the weight of the matrix resin. Also useful are predominantly poly(vinyl halide) resins in which the sum of all poly(vinyl halide) resins constitutes 75% to 99.9% by weight of the matrix resin, based on the weight of the matrix resin; additionally useful are predominantly poly(vinyl halide) resins in which the sum of all poly(vinyl halide) resins constitutes 90% to 99.9% by weight of the matrix resin, based on the weight of the matrix resin. Additionally, one example of a poly(vinyl halide) resin that is useful for use in predominantly poly(vinyl halide) resins is PVC. In some useful predominantly poly(vinyl halide) resins, PVC is the only poly(vinyl halide) that is present.

The practice of some embodiments of the present invention involves blends of at least one matrix resin with at least one polymeric composition of the present invention. Such blends optionally include one or more additional ingredients. In some embodiments, such blends include 0.01 or more solid weight percent of the polymeric composition of the present invention, based on the solid weight of the matrix resin; in other embodiments, such blends include 0.05 or more; 0.1 or more; or 0.25 or more solid weight percent of the polymeric composition of the present invention, based on the solid weight of the matrix resin. In some embodiments, such blends include 50 or less solid weight percent of the polymeric composition of the present invention, based on the solid weight of the matrix resin; in other embodiments, such blends include 20 or less; 5 or less; or 2.5 or less solid weight percent of the polymeric composition of the present invention, based on the solid weight of the matrix resin.

Blends of matrix resins and plastic additives often contain one or more additional ingredients, such as, for example, stabilizers and pigments. Common stabilizers include, for example, those that contain lead and those that contain tin; stabilizers that do not contain lead are preferred; more preferred are stabilizers that do not contain lead and that do contain tin. Common pigments include, for example, titanium dioxide, calcium carbonate, and mixtures thereof.

The blends of matrix resin and the polymeric compositions of the present invention may additionally contain zero, one, or more conventional processing aids. Independently, such blends may additionally contain zero, one, or more lubricants other than the polymeric compositions of the present invention. Also independently, such blends may additionally contain zero, one, or more stabilizers. These and other ingredients may be added to the blend of matrix resin and the polymeric compositions of the present invention in any order and in any combination. Some ingredients or portions thereof may be mixed with each other, and the resulting mixture may be then mixed with other ingredients. Any order and any combination of mixing the ingredients is envisioned in the practice of the present invention.

In some embodiments of the present invention, a blend of matrix resin and at least one plastic additive is made by adding the polymeric compositions of the present invention to the matrix resin using methods referred to herein as "one-pack" methods. As defined herein, "one-pack" methods are those methods in which all polymeric compositions of the present invention, all the conventional processing aids that are present, all the stabilizers that are present, and all the lubricants that are present other than the polymeric compositions of the present invention are mixed with each other, prior to their addition to the matrix resin. The mixture of the polymeric compositions of the present invention, the conventional processing aids, the stabilizers, and the lubricants other than the polymeric compositions of the present invention is known herein as the "single pack." It is to be understood that "one pack" methods include, for example, methods of making blends that lack one or more of the following: conventional processing aids, stabilizers, and lubricants other than the polymeric compositions of the present invention. "One pack" methods are those methods in which, if such ingredients are included in the blend, they are incorporated in the blend by being first included in the single pack and then added to the matrix resin and optional other ingredients. The single pack optionally includes some of the matrix resin; the single pack will include 50% or less by weight of the matrix resin, based on the weight of the single pack.

In some one-pack embodiments, one or more additional ingredients, such as, for example, pigments and fillers, may optionally be present in the blend of matrix resin and plastic additives. These optional additional ingredients may be included in the single pack, or they may be added to the matrix resin separately from the single pack, or they may be partially (in any proportion or combination) included in the single pack and partially added to the matrix resin separately from the single pack.

The following examples illustrate certain specific embodiments of the invention.

EXAMPLE 1

Polymeric compositions having Polymer Size Index of 2 or higher and having low glass transition temperatures were made by emulsion polymerization as follows:

71.39 parts of deionized water and 0.05 parts of sodium chloride were charged to a suitable reactor that can be heated, cooled, stirred; and fitted with a nitrogen gas sparge/sweep, a condenser and a means to monitor temperature. The solution was heated to about 55° C. while stirring slowly and sparging the solution with a slow stream of nitrogen. After about 30 minutes, and with the solution at 50-55° C., a sweep of nitrogen was used.

Then, 4.25 parts of a 28% aqueous solution of sodium lauryl sulfate and 0.007 parts of a 5% aqueous solution of sodium ferric ethylenediaminetetraacetate were added. The mixture was stirred for about 2 minutes. Thereafter 23.80 parts of ethyl acrylate was added.

After the monomer was added, 0.27 parts of a 5% aqueous solution of t-butyl hydroperoxide-70% and 0.24 parts of a 5% aqueous solution of sodium formaldehyde sulfoxylate were also added to the mixture. After polymerization began, the temperature increased to approximately 90° C. The reaction was maintained at the peak temperature for approximately 15 minutes. Thereafter, the reaction was cooled to below 50° C. and filtered.

This process gave a 24% solids emulsion having particles with an average size of 89 nm particle size, and approximately 500 parts per million of residual ethyl acrylate. The molecular weight of the solids as determined by Gel Permeation Chromatography, using the HMLT method, was approximately $4.8 \times 10^6$ grams/mole. The viscosity by the solution Brookfield test was 0.545 Pa*s (545 cps).

EXAMPLE 2

The first step was to make a PVC powder blend using a jacketed, high intensity mixer, MERLIN FM-10, which could be heated and cooled. 2500 g OXYVINYL™ 155 PVC (K value 49, made by OXYCHEM Corp.) was charged to the blender. The PVC was heated and mixed at a rate of 20 meters/second. When the temperature of the mixture reached 50° C., 38 g of ADVASTAB™-181 tin-based heat stabilizer (made by Rohm and Haas Company) was added. Then, when the temperature of the mixture reached approximately 90° C., the following amounts of the product from EXAMPLE 1 were added:

| | |
|---|---|
| Example 2a | 25 g of solid polymer made in EXAMPLE 1 [1 part per 100 parts of PVC] |
| Example 2b | 50 g of solid polymer made in EXAMPLE 1 [2 parts per 100 parts of PVC] |
| Example 2c | 75 g of solid polymer made in EXAMPLE 1 [3 parts per 100 parts of PVC] |

In each of the mixtures set out above, cooling water was added to the jacket when the temperature of the mixture reached approximately 101° C. Thereafter, 2.5 grams of OP wax (an ester wax made by Hoechst Celanese Corp.) was added to the high intensity mixer at approximately 98° C., followed by 125 gms [5 parts per 100 parts of PVC] RCL-4 titanium dioxide (sold by TICONA) at 90° C. The temperature was then lowered to below 60° C.

The second step was to extrude the powder blend in a L/D: 25/1 HAAKE Fisons RHEOMEX™ 252 single screw extruder driven by a HAAKE Fisons RHEOCORD™ 90 rheometer. Here, a 5 millimeter capillary die was used to form rod samples to measure melt elasticity by dieswell. Extrusion rate was also measured. The heating zone temperatures were as follows:

| Zone | Temperature (° C.) |
|---|---|
| 1 | 170 |
| 2 | 180 |
| 3 | 190 |
| Die | 170 |

With the extruder heated to the desired temperatures, the screw was started at a fixed rpm of about 60. The PVC powder blend was added to the feed funnel at the throat of the extruder and a timer was used to be sure the blend was fused and equilibrated. This took approximately 7 minutes.

To measure the dieswell and extrusion rate the following was done: the rod extrudate was cut at the die and a timer started; the extrudate slowly dropped to a point 870 millimeters below the die opening. At this point the extrudate was cut again at the die opening and the timer stopped. The extrusion rate was calculated as weight of the coiled rod in grams divided by the time it took to drop 870 millimeters below the die, in seconds.

Another sample of the rod extrudate of approximately 150 millimeters in length was taken and cooled to measure the die swell in millimeters. The dieswell was calculated by the following equation: Extruded rod diameter (mm) divided by the die opening diameter (mm)×100.

EXAMPLE 3

In this Example, the first step of EXAMPLE 2 was repeated with the following exceptions. When the temperature of the mixture reached approximately 90° C., the following was added:

| | |
|---|---|
| Example 3a | 25 g Paraloid ™ K-400 [Rohm and Haas Co] (1part per100 parts of PVC) |
| Example 3b | 50 g Paraloid ™ K-400 [Rohm and Haas Co] (2parts per100 parts of PVC) |
| Example 3c | 75 g Paraloid ™ K-400 [Rohm and Haas Co] (3parts per100 parts of PVC) |

The balance of the processes used in this Example was completed the same manner as set out in EXAMPLE 2.

EXAMPLE 4

The products from the first step of EXAMPLE 2a and EXAMPLE 3a were used to extrude rods at higher temperature conditions. In this Example, the extrusion process (step 2) was changed as follows:

| Zone | Temperature (° C.) |
|---|---|
| 1 | 185 |
| 2 | 195 |
| 3 | 205 |
| Die | 185 |

The extrusion process set out in EXAMPLE 2 was then repeated and data collected.

The following Data Table illustrates the processing benefit for the present invention. Melt elasticity as measured by swelling of the extrudate [dieswell] and lubrication benefit as seen in faster extrusion rates and less yellowing of the rods at high processing temperatures are shown.

| Example | Description | $Mw^c$ (g/mole) | Tg (° C.) | Die swell$^d$ (%) | Extrusion Rate (gm/sec) | $YI^e$ of extruded rod |
|---|---|---|---|---|---|---|
| 2a | Invention 1 phr$^a$ | 4.8 | −22 | 183 | 0.89 | 18.0 |
| 2b | Invention 2 phr | | | 193 | | |
| 2c | Invention 3 phr | | | 203 | | |
| 3a | K-400$^b$ 1 phr | 6.0 | >70 | 175 | 0.79 | 22.5 |
| 3b | K-400 2 phr | | | 195 | | |
| 3c | K-400 3 phr | | | 217 | | |

$^a$phr = parts per 100 parts of PVC resin.
$^b$K-400 means PARALOID ™ K-400, a high molecular weight acrylic processing aid for PVC made by Rohm and Haas Company.
$^c$Molecular weight x $10^6$, which was determined using the HMLT method.
$^d$Dieswell was the diameter (mm) of cooled rod divided by the diameter of die opening x 100 (higher values indicate more melt strength).
$^e$YI is the Yellowness Index measured on rods extruded at high melt temperature, using Hunterlab ™ Labscan ™ XE instrument with illuminant C, 2° standard observer, 6.35 mm (0.25 inch) aperture.

As can be seen from the above, the present invention provides processing aid characteristics, as well as lubricating characteristics.

COMPARATIVE EXAMPLE 5

The following comparative formulation was made, using the method of Example 2:

| parts by weight | Ingredient | Description |
|---|---|---|
| 100 | PVC K59 | polyvinyl chloride resin, K-value of 59 |
| 1.2 | TM-181 | as above |
| 10 | BTA-730L | Paraloid ™ impact modifier from Rohm and Haas Co. |
| 0.5 | K-120ND | Paraloid ™ processing aid from Rohm and Haas Co. |
| 0.5 | K-175 | Paraloid ™ processing aid from Rohm and Haas Co. |
| 0.2 | OP wax | as above |
| 0.1 | E wax | Ethylene dimontanate from Hoechst Celanese Co. |
| 0.6 | Aldo MS | Glycerol Monostearate from Lonza Corp. |
| 0.06 | toner | Violet 13 (1%) in PVC from Pfaltz and Bauer Co. |

EXAMPLES 6 AND 7

Aqueous latex of impact modifier Paraloid™ BTA-730L was blended with aqueous latex of the invention from Example 1, in amounts chosen to give ratio of BTA-730L solids to Example 1 solids of 20:1. This blend was diluted with water to have 30% solids; it was then added to HCl solution at room temperature to coagulate the latex; the coagulated latex was filtered and dried in an oven at 60° C. The resulting powder is labeled herein as "730/SFA/H." The process was repeated, this time using solids ratio of 10:1, and the resulting powder is labeled herein as "730/SFA/1." The following formulations were made, using selected ingredients also used in comparative example 5:

| Example No. | PVC K59 parts by weight | TM-181 parts by weight | Powder Blend Type | Powder Blend parts by weight | toner parts by weight |
|---|---|---|---|---|---|
| 6 | 100 | 1.2 | 730/SFA/H | 10.5 | 0.06 |
| 7 | 100 | 1.2 | 730/SFA/1 | 11 | 0.06 |

COMPARATIVE EXAMPLE C8 AND EXAMPLES 9 AND 10

The formulations of Comparative Example 5 and Examples 6 and 7 were tested in an internal mixer and by impact testing. The internal mixer is a Haake Rheocord™ system 90 bowl. 60 g of solid formulation is added to the bowl and tested at 55 revolutions per minute at 175° C. The time to fusion (the time at which peak torque occurs; (one measure of the ease with which the PVC resin becomes a smoothly-flowing melt) and the torque at equilibrium (6 minutes after fusion) were recorded. Samples were removed from the bowl at various times and tested for YI as in Example 4.

Also, the impact resistance of each formulation was tested. 210 g of formulation were placed onto a 2-roll mill (Collin mill, 180° C., front roll at 26 revolutions per minute (rpm) and the back roll at 20 rpm). After fluxing, material was milled for 5 minutes, removed from the mill rolls, compression molded into a plaque. Samples were cut and tested for Izod impact resistance according to ASTM D-256A.

The results of the testing were as follows:

| Example No. | Formulation from Example No. | Time to Fusion (sec) | Equilibrium Torque (m * gm) | Izod Impact (J/m [ft * lb/in]) | YI at various times | | | | |
|---|---|---|---|---|---|---|---|---|---|
| | | | | | 2 min | 4 min | 6 min | 9 min | 12 min |
| C8 | Comparative 5 | 55 | 2438 | 1153 [21.6] | 0.2 | 6.6 | 18 | 34 | 50 |
| 9 | 6 | 33 | 2459 | 1047 [19.6] | −2.2 | 7.5 | 19 | 35 | 56 |
| 10 | 7 | 58 | 2395 | 1148 [21.5] | 2.6 | 9.9 | 22 | 39 | 72 |

These results show that invention examples 6 and 7 have useful properties of ease of fusion, lubricant nature, impact resistance, and resistance to degradation (measured by YI). The properties of invention examples 6 and 7 are comparable to comparative example 5, even though invention examples 6 and 7 are made without a variety of processing aids and lubricants that are present in comparative example 5.

Comparative Example C8 and Examples 9 and 10 were also tested for mill-roll release. Each formulation was placed on a two-roll mill as above; after the material is cut and mixed repeatedly for 5 minutes, the material was allowed to circulate on the rolls without cutting for 30 seconds. Using a brass knife, the material was quickly cut along the midline (the bottom part of the roll) of the front (nearest the operator) roller, and the subsequent separation of the material from the rolls is observed. "Excellent (E)" meant that the material came off the roller with no further cuts; "Poor (P)" meant that the material stayed fully on the roll, showing no change other than the line where the knife cut was made. Somewhat more separation than "Poor" was rated "Fair (F)"; somewhat more separation than "Fair" was rated "Good (G); and more separation than "Good" but less separation than "Excellent" was rated "Very Good (VG)." The results of the mill-roll release test were as follows:

| Example No. | Formulation from Example No. | Mill-Roll Release |
|---|---|---|
| C8 | Comparative 5 | VG |
| 9 | 6 | F to G |
| 10 | 7 | E |

These results show that the mill-roll release of Example 9 is acceptable, and that of Example 10 is better than the standard sample Comparative Example C8, even though Examples 9 and 10 lack several standard processing aids and lubricants.

COMPARATIVE EXAMPLES C11-C14

The following comparative formulations were made. These are PVC foam formulations. After extrusion, the formulations have relatively high die swell and relatively low density. Amounts of ingredients are listed below as "pbw" for "parts by weight." The following base formulation was used for comparative examples C11-C14:

| pbw | Ingredient | Description |
|---|---|---|
| 100 | OXY 200F | PVC, K value 62, from Occidental Chemical Co. |
| 1.5 | TM-950F | Tin-based thermal stabilizer from Rohm and Haas Co. |
| 1 | TiO$_2$ | commodity |
| 1 | Calcium Stearate | commodity |
| 5 | CaCO$_3$ | commodity |

The comparative examples were made as follows ("PA" means "processing aid"):

| Example No. | Base Formulation (pbw) | Advawax ™-165[f] (pbw) | K-175[g] (pbw) | AZRV[h] (pbw) | PA type | PA (pbw) |
|---|---|---|---|---|---|---|
| C11 | 108.5 | 0.5 | 1 | 0.7 | K-400 | 6 |
| C12 | 108.5 | 0.5 | 1 | 0.7 | K-435[i] | 6 |
| C13 | 108.5 | 0.4 | 0.5 | 0.5 | K-400 | 6 |
| C14 | 108.5 | 0.4 | 0.5 | 0.5 | K-435[i] | 6 |

[f]Advawax ™-165 is paraffin wax from Rohm and Haas Co.
[g]K-175 is a Paraloid ™ processing aid from Rohm and Haas Co.
[h]AZRV is azodicarbonamide blowing agent from Uniroyal Chemical Co.
[i]K-435 is a Paraloid ™ processing aid from Rohm and Haas Co.

EXAMPLES 15-18

The following formulations were made. These are PVC foam formulations. After extrusion, the formulations have relatively high die swell and relatively low density. Amounts of ingredients are listed below as "pbw" for "parts by weight." The base formulation was the same as that used for comparative examples C11-C14.

In these examples, the following abbreviations are used:
"400/SPA"=blend of 75 pbw K-400 and 25 pbw Example 1
"435/SPA"=blend of 75 pbw K-435 and 25 pbw Example 1

The blend 400/SPA was made by blending aqueous latex of K-400 with the aqueous latex of Example 1 in quantities chosen to give ratio of 75/25 for the solids of K-400 to the solids of Example 1. The blend was then diluted with water to have 30% solids. The blend was then fed into a NIRO Mobile Minor lab spray drier under the following conditions:

atomizer speed approximately 35,000 rpm by air pressure inlet air temperature set at 160° C.

blend feed rate set to achieve outlet temperature of 60° C. powder was collected from the out let and used as described below.

The examples were made as follows ("PA" means "processing aid"):

| Example No. | Base Formulation (pbw) | Advawax™-165 (pbw) | K-175 (pbw) | AZRV (pbw) | PA type | PA (pbw) |
|---|---|---|---|---|---|---|
| 15 | 108.5 | 0.5 | 1 | 0.7 | 400/SPA | 6 |
| 16 | 108.5 | 0.5 | 1 | 0.7 | 435/SPA | 6 |
| 17 | 108.5 | 0.4 | 0.5 | 0.5 | 400/SPA | 6 |
| 18 | 108.5 | 0.4 | 0.5 | 0.5 | 435/SPA | 6 |

COMPARATIVE EXAMPLES C19-C22 AND EXAMPLES 23-26

The foam formulations described in Comparative Examples C11-C14 and in Examples 15-18 were extruded. Extrusion was performed in the same Haake equipment as in Example 2, at 60 rpm, with zone temperatures of 170° C. (zone1), 180° C. (zone2), 190° C. (zone3), and 170° C. (zone4). Results were as follow:

| Example No. | Formulation from Example No. | Melt Temperature (° C.) | Extruder Torque (m * gm) | Density (g/cc) | Die Swell (%) |
|---|---|---|---|---|---|
| C19 | C11 | 198 | 9716 | 0.42 | 247 |
| 23 | 15 | 195 | 6436 | 0.38 | 241 |
| C20 | C12 | 196 | 9544 | 0.35 | 264 |
| 24 | 16 | 194 | 6144 | 0.36 | 266 |
| C21 | C13 | 195 | 9607 | 0.43 | 244 |
| 25 | 17 | 192 | 6623 | 0.44 | 243 |
| C22 | C14 | 196 | 9565 | 0.42 | 260 |
| 26 | 18 | 195 | 6806 | 0.43 | 262 |

Comparative Examples C19, C20, C21, and C22 were made with normal processing aids and lubricants, and they showed acceptable properties. In each case, some of the processing aid was replaced with Example 1 of the present invention, and the resulting formulation (Examples 23, 24, 25, and 26, repectively), showed similar melt temperature, density, and die swell, while also showing lower torque.

COMPARATIVE EXAMPLE C27

The following comparative formulation was made, using the methods of Example 2:

| pbw | Ingredient | Description |
|---|---|---|
| 100 | PVC K65 | PVC, K value 65 |
| 1.2 | TM-202 | TM-202 is tin-based stabilizer from Rohm and Haas Co. |
| 4 | IM | Paraloid ™ KM-399 from Rohm and Haas Co. |
| 1 | K-120ND | as above |
| 0.5 | K-175 | as above |
| 1.4 | CaSt2 | Calcium Stearate |

| pbw | Ingredient | Description |
|---|---|---|
| 0.9 | Wax 165 | paraffin wax from Rohm and Haas Co. |
| 0.1 | AC-629A | oxidized polyethylene wax from Allied Signal Co. |
| 1 | RCL4 | TiO$_2$ from Ticona Co. |
| 10 | CaCO$_3$ | commodity |

EXAMPLES 28 AND 29

Using the method of Example 6, except for the use of CaCl$_2$ instead of HCL, impact modifier emulsion polymer Paraloid™ KM-399 from Rohm and Haas Co. was mixed with emulsion polymer from Example 1. The mixture was made at solids ratio of KM-399 to Example 1 of 8:1, and the resulting powder is called "399/SPA/H/28." The procedure was repeated at solids ratio of 4:1, and the resulting powder is called "399/SPA/1/29."

The following formulations were made, using the methods of Example 2:

| Ingredient | Example 28 (pbw) | Example 29 (pbw) |
|---|---|---|
| PVC K65 | 100 | 100 |
| TM-202 | 1.2 | 1.2 |
| IM type | 399/SPA/H/28 | 399/SPA/1/29 |
| IM amount | 4.5 | 5 |
| CaSt2 | 1.3 | 1.25 |
| Wax 165 | 1.1 | 1.2 |
| RCL4 | 1 | 1 |
| CaCO$_3$ | 10 | 10 |

COMPARATIVE EXAMPLE C30 AND EXAMPLES 31 AND 32

The formulations from Comparative Example C27 and from Examples 28 and 29 were extruded in a CM-35 twin-screw extruder, manufactured by Cincinnati Milicron, under conditions: Zone 1, 188° C. (370° F.); Zone 2, 185° C. (365° F.); Zone 3, 182° C. (360° F.); screw oil 171° C. (340° F.), Adaptor D1; Body D2, Side D3, Side D4, all at 191° C. (375° F.); 18 rpm; 152 mm (6 inch) sheet die; high shear screws. The torque was evaluated using "% load," which is a percentage of the maximum torque load of which the extruder is capable. The formulation was also evaluated for dart impact resistance, using the Gardner Impact method, ASTM D 5420-98a, with the mean failure energy divided by the sample thickness. The results were as follows:

| Example No | Formulation from Example No. | % Load | Extrusion Rate (g/sec [lb/hr]) | Gardner Dart Impact (J/mm [in · lb/mil]) |
|---|---|---|---|---|
| C30 | C27 | 61 | 56 [7.1] | 15.1 [3.4] |
| 31 | 28 | 51 | 58 [7.3] | 15.1 [3.4] |
| 32 | 29 | 48 | 59 [7.4] | 14.2 [3.2] |

Comparative Example C30 shows acceptable properties. Examples 31 and 32 show similar extrusion rate, similar impact resistance, and lower percent load, even though they lack K-120ND, K-175, and AC629A.

EXAMPLES 33-36 AND COMPARATIVE EXAMPLE C37

Using the method of Example 1, additional polymers were made. In each of the additional polymers, the 23.80 parts of ethyl acrylate was replaced with approximately 23.80 parts of a mixture of acrylic monomers; the mixtures were chosen to yield polymers of various Tg's. After each polymer was made, the Tg was measured twice, and the average is reported below. Each of the polymers was included in a PVC formulation and extruded, using the methods of Example 2. In each case, 1 part of polymer by weight per 100 parts by weight of PVC was used. The results were as follows:

| Example No. | Tg (° C.) | Extrusion Rate (g/sec) |
|---|---|---|
| 33[j] | −15 | 0.83 |
| 34 | −9 | 0.83 |
| 35 | −2 | 0.82 |
| 36 | 5 | 0.80 |
| C37[k] | >75° C. | 0.78 |

[j]repeat of Example 1.
[k]polymer used was Paraloid™ K-120ND, which has Tg above 75° C.

The formulations that include the polymeric compositions of the present invention (Example 33-36) show improved melt processing characteristics, as shown by the desirably higher extrusion rates, when compared with the formulation (Comparative Example C37) that used conventional processing aid Paraloid™ K120ND.

That which is claimed is:

1. A method for improving the processability of a matrix resin, comprising adding to said matrix resin a plastic additive consisting essentially of
    (I) a polymeric composition having a Polymer Size Index of 3 or higher and a glass transition temperature (Tg) of less than 10° C., wherein said polymeric composition comprises a first polymeric stage, wherein at least 50 weight percent of said first polymeric stage comprises a first polymeric component, wherein said first polymeric component consists of units derived from
        (A) at least one monomer selected from the group consisting of methyl acrylate, ethyl acrylate, and butyl acrylate, and
        (B) optionally, one or more additional monomer selected from the group consisting of butadiene; dienes other than butadiene; isoprene; (meth)acrylic acid; substituted C1 to C18 alkyl (meth)acrylates; styrene; substituted styrenes; vinyl alcohols; vinyl ethers; vinyl esters; vinyl halides; vinyl nitriles, and $C_1$-$C_{18}$ alkyl (meth)acrylates other than methyl acrylate, ethyl acrylate, and butyl acrylate,
    wherein said polymeric composition (I) reduces the time required for solid polyvinyl chloride resin to form a homogeneous melt upon exposure to heat and mechanical work, and
    wherein said polymeric composition (I) lubricates polyvinyl chloride resin,
    (II) optionally, at least one processing aid that is hard particles which have Tg of at least 30° C.;
    (III) optionally, at least one lubricant other than said polymeric composition (I);
    (IV) optionally, at least one impact modifier that has a core that is a homopolymer or copolymer of butadiene, acrylate monomers, or a combination thereof, wherein said core has Tg less than −20° C., wherein said core is spherical or nearly spherical, and wherein said shell has Tg greater than 30° C.;
    (V) optionally, at least one stabilizer; and
    (VI) optionally, at least one inorganic oxide, at least one inorganic carbonate, or a mixture thereof,
    wherein said matrix resin is poly(vinyl chloride),
    wherein, after adding said plastic additive to said matrix resin, the predominant matrix resin in the resulting blend of plastic additive and matrix resin is poly(vinyl chloride), and
    wherein said improving the processability of said matrix resin comprises improving fusion in said resin and comprises providing lubricant properties.

2. The method as recited in claim 1, wherein said polymeric composition has a Polymer Size Index of 4 and a Tg of less than 0° C.

3. The method of claim 1, wherein said first polymeric component consists essentially of units derived from monomers selected from the group consisting of methyl acrylate, ethyl acrylate, and butyl acrylate.

4. The method of claim 1, wherein said first polymeric component consists essentially of units derived from ethyl acrylate.

5. The method of claim 1, wherein the amount of said plastic additive is 0.05 solid weight percent or more, based on the solid weight of said matrix resin.

6. The method of claim 1, wherein the amount of said plastic additive is 0.1 solid weight percent or more, based on the solid weight of said matrix resin.

7. The method of claim 1, wherein the amount of said plastic additive is 0.25 solid weight percent or more, based on the solid weight of said matrix resin.

8. The method of claim 1, wherein said first polymeric component consists of units derived from monomers selected from the group consisting of methyl acrylate, ethyl acrylate, and butyl acrylate, and wherein the amount of said plastic additive is 0.05 solid weight percent or more, based on the solid weight of said matrix resin.

9. The method of claim 1, wherein said plastic additive consists of said (I), said (II), said (III), said (IV), said (V) and said (VI).

10. The method of claim 1, wherein said polymeric composition has Tg of less than −10° C.

11. The method of claim 1, wherein said polymeric composition has weight average molecular weight of 4,000,000 or higher.

12. The method of claim 1, wherein said first polymeric component consists of units derived from butyl acrylate and ethyl acrylate.

13. The method of claim 1, wherein said first polymeric component consists of units derived from ethyl acrylate.

14. A method for improving the processability of a matrix resin, comprising adding to said matrix resin a plastic additive consisting essentially of
    (I) a polymeric composition having a Polymer Size Index of 3 or higher and a glass transition temperature (Tg) of less than 10° C., wherein said polymeric composition comprises a first polymeric stage, wherein at least 50 weight percent of said first polymeric stage comprises a first polymeric component, wherein said first polymeric component consists of units derived from (A) at least one monomer selected from the group consisting of methyl acrylate, ethyl acrylate, and butyl acrylate, and (B) optionally, one or more additional monomer selected from the group consisting of butadiene; dienes other than butadiene; isoprene; (meth)acrylic acid; substituted C1 to C18 alkyl (meth)acrylates; styrene; substituted styrenes; vinyl alcohols; vinyl ethers; vinyl esters; vinyl halides; vinyl nitriles, and $C_1$-$C_{18}$ alkyl (meth)acrylates other than methyl acrylate, ethyl acrylate, and butyl acrylate, wherein said polymeric composition (I) reduces the time required for solid polyvinyl chloride resin to form a homogeneous melt upon exposure to heat and mechanical work, and wherein said polymeric composition (I) lubricates polyvinyl chloride resin, (II) optionally, at least one processing aid that is hard particles which have Tg of at least 30° C.;

(III) optionally, at least one lubricant other than said polymeric composition (I);

(IV) optionally, at least one impact modifier that has a core that is a homopolymer or copolymer of butadiene, acrylate monomers, or a combination thereof, wherein said core has Tg less than −20° C., wherein said core is spherical or nearly spherical, and wherein said shell has Tg greater than 30° C.;

(V) optionally, at least one stabilizer; and (VI) optionally, at least one inorganic oxide, at least one inorganic carbonate, or a mixture thereof, wherein said matrix resin is a matrix resin in which the sum of all poly(vinyl chloride) resin constitutes 75% to 99.9% by weight of said matrix resin, based on the weight of said matrix resin, wherein, after adding said plastic additive to said matrix resin, the predominant matrix resin in the resulting blend of plastic additive and matrix resin is a matrix resin in which the sum of all poly(vinyl chloride) resin constitutes 75% to 99.9% by weight of said matrix resin, and wherein said improving the processability of said matrix resin comprises improving fusion in said resin and comprises providing lubricant properties.

15. The method of claim 14, wherein said polymeric composition has weight average molecular weight of 4,000,000 or higher.

16. The method of claim 14, wherein said first polymeric component consists of units derived from butyl acrylate and ethyl acrylate.

17. The method of claim 1, wherein said first polymeric component consists of units derived from ethyl acrylate.

* * * * *